United States Patent [19]

Jones

[11] 4,404,984

[45] Sep. 20, 1983

[54] GAS-LIQUID MIXING METERING SYSTEM

[76] Inventor: James S. Jones, 45 Crown Pl., Richardson, Tex. 75080

[21] Appl. No.: 349,533

[22] Filed: Feb. 17, 1982

Related U.S. Application Data

[63] Continuation of Ser. No. 155,931, Jun. 3, 1980, abandoned.

[51] Int. Cl.$^3$ ............................................. G05D 11/03
[52] U.S. Cl. .................................... 137/88; 137/205.5
[58] Field of Search ..................... 251/46; 137/88, 100, 137/114, 625.4, 205.5

[56] References Cited

U.S. PATENT DOCUMENTS

| | | | |
|---|---|---|---|
| 1,179,468 | 4/1916 | Stenning | 137/625.4 |
| 2,384,669 | 9/1945 | Fields | 137/114 |
| 2,588,242 | 3/1952 | Hunter | 251/46 |
| 2,691,504 | 10/1954 | Jones | 251/46 |
| 3,220,710 | 11/1965 | Forster | 137/114 |
| 3,776,274 | 12/1973 | Riley | 137/205.5 |
| 4,295,545 | 10/1981 | Hiei | 137/205.5 |

FOREIGN PATENT DOCUMENTS

| | | | |
|---|---|---|---|
| 65551 | 6/1944 | Denmark | 137/114 |
| 1550357 | 7/1966 | Fed. Rep. of Germany | 137/625.4 |

*Primary Examiner*—Martin P. Schwadron
*Assistant Examiner*—J. R. Shay
*Attorney, Agent, or Firm*—Richards, Harris & Medlock

[57] ABSTRACT

A gas-liquid blender (30) is provided for metering a liquid into the controlled flow of gas. The blender (30) includes a gas inlet (32), an outlet (42), a variable proportioning device or mixing valve (38) between the gas inlet (32) and outlet (42), and a liquid inlet (36) to the variable proportioning device (38). A diaphragm controlled servo positioning valve (44) is disposed between the gas inlet (32) and the variable proportioning device (38) and is opened and positioned by a diaphragm controlled throttle valve (58) which differentially senses liquid pressure and gas pressure to the variable proportioning device (38). Adjustment means (102, 104) are provided for the throttle valve (58) to increase the pressure difference across the liquid leg of the variable proportioning device (38) between the liquid inlet (36) and the outlet (42) without increasing the pressure difference across the gas leg of the variable proportioning device (38).

13 Claims, 10 Drawing Figures

GAS-LIQUID MIXING METERING SYSTEM

This is a continuation of application Ser. No. 06/155,931 filed June 3, 1980, now abandoned.

TECHNICAL FIELD

This invention relates to metering of a liquid into the controlled flow of gas, and more particularly to a system in which the presence of liquid is sensed to establish a metering base.

BACKGROUND ART

Liquid hydrocarbons heretofore have been entrained in a stream of gaseous hydrocarbons for flow to a utilization manifold. Where a plurality of user devices are selectively and intermittently actuated, it has been found to be difficult to provide a uniform mixture. For example, there may be hundreds of utilization devices, such as flame cutting torches, heat treating devices, metal working devices, etc., connected to a given manifold. All the devices may demand fuel at a given time or only one or two may be in use. Thus, a wide range of flow is to be regulated. A need exists for a system supplying multiple utilization devices with uniform fuel in response to intermittent and uncoordinated demands for fuel on the system.

SUMMARY OF THE INVENTION

The present invention provides a control blender wherein the gas metering pressure is isolated from the liquid metering pressure. Differential sensor means in the form of a throttle valve senses liquid pressure and gas pressure and controls a gas inlet servo valve to supply gas to a variable proportioning device or mixing valve which delivers a gas-liquid mix to an outlet.

The throttle valve includes a diaphragm acted upon by gas pressure on one side and by liquid pressure on the other side. The throttle valve normally closes a valve seat blocking communication between gas passages on either side of the valve seat. A demand for fuel by a utilization device reduces the pressure on the gas side of the throttle diaphragm, enabling liquid pressure to open the throttle valve. This opens a gas passage through the throttle valve seat from one side of a servo diaphragm. The reduced gas pressure of the one side of the servo diaphragm enables opening, and controls positioning, of the servo valve supplying gas pressure to the mixing valve.

The throttle valve includes adjustment means for varying the pressure difference between the outlet and the liquid side of the throttle valve without affecting gas pressure differential, whereby to adjust the gas-liquid ratio at the outlet without changing components in the liquid metering portion of the mixing valve.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
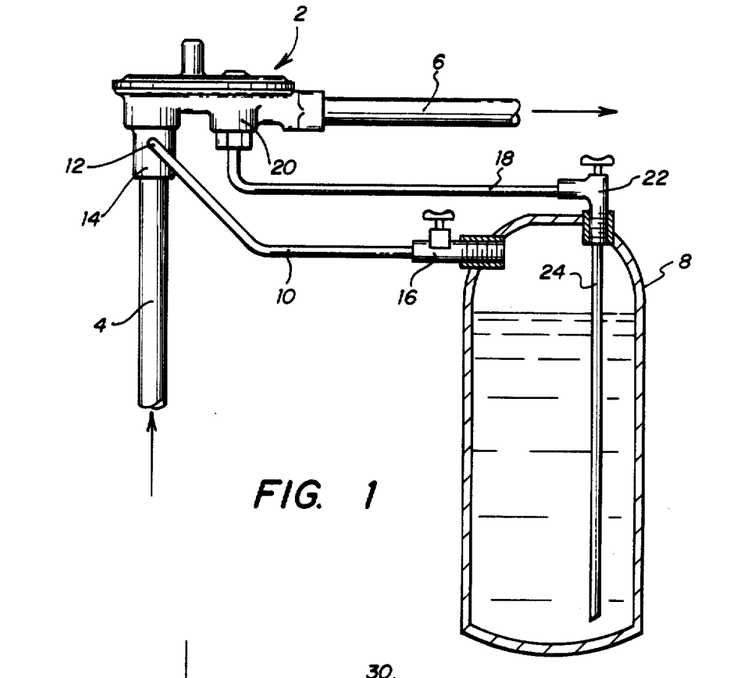
FIG. 1 illustrates an embodiment of the invention used in connection with a liquid supply source and a gaseous supply source.

Referring to FIG. 1, a blender 2 is connected to a pressurized gas supply line 4 for delivering a controlled flow of fuel gas to an output line 6. A container 8 of liquid fuel is connected by way of line 10 to an auxiliary port 12 of gas inlet 14. A valve 16 is provided to permit removal of tank 8 for replacement purposes. A line 18 extends to the liquid fuel inlet 20 of the blender by way of a valve 22 and riser 24 which extends from the bottom of tank 8. Gas pressure in line 4 is thus applied, by way of line 10 and valve 16, to the surface of the liquid in tank 8, forcing liquid up through the riser 24, valve 22 and line 18. Liquid fuel is thus made available for use on demand at the liquid fuel inlet 20 of blender 2. Output line 6 delivers a gas-liquid mix to a manifold from which a plurality of utilization devices may be supplied on demand with a gas-liquid fuel mixture.

Figure 2:
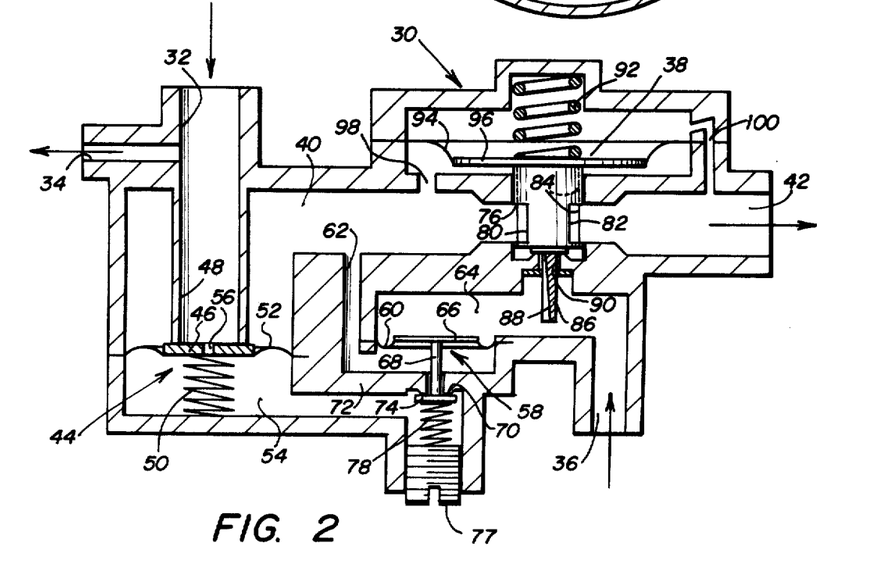
FIG. 2 is a schematic section diagram of an embodiment of the invention.

FIG. 2 schematicaly illustrates an embodiment of a blender 30. The blender has a gas inlet 32 for connection to a gas supply line, and an auxiliary port 34 for connection to container 8, FIG. 1, to force liquid fuel to force liquid to liquid inlet 36. A variable proportioning device or mixing valve, generally designated 38, mixes gas from gas flow passage 40 and liquid from liquid inlet 36 for delivery to outlet 42.

Gas inlet 32 is provided with a normally closed servo positioning valve 44 having a disk 46 normally engaging the annular end face of a tubular inlet passage 48 by means of a light spring 50 or by dead weight when mounted above the end face as would be the case in the blender 2 of FIG. 1. Disk 46 is attached to a diaphragm 52 which separates gas flow passage 40 from a control passage 54. Servo valve 44 is opened and positioned by a pressure difference across servo diaphragm 52 when the gas pressure in control passage 54 is reduced. The servo valve 44 has a bleeder orifice 56 therethrough so that in the normally closed position the gas pressure in control passage 54 against the bottom of diaphragm 52 is equal to the inlet gas pressure at gas inlet 32. When servo valve 44 is open, gas flows from inlet 32 around the end of tubular passage 48 into flow passage 40.

Differential sensor means in the form of a throttle valve 58 senses gas pressure and liquid pressure on either side of a throttle diaphragm 60. A linking gas passage 62 communicates between flow passage 40 and one side of the throttle diaphragm to apply gas pressure thereto. The other side of the throttle diaphragm communicates with liquid inlet 36 through an appropriate liquid passage 64 whereby liquid pressure is applied thereto. Throttle valve 58 includes a disk 66 attached to diaphragm 60 with a stem 68 extending through a valve seat 70 in the form of an aperture through a dividing wall 72 between linking gas passage 62 and control gas passage 54. The stem has a valve face 74 normally closing valve seat 70 and blocking communication between control passage 54 and linking passage 62. Throttle valve 58 is opened by pressure differential across throttle diaphragm 60 when the gas pressure in linking passage 62 is reduced. Valve face 74 disengages valve seat 70 to establish communication from control passage 54 through valve seat 70 to linking passage 62. This evacuates or reduces the pressure in control passage 54, resulting in opening of servo valve 44.

Variable proportioning device 38 is in the form of a mixing valve with a gas metering portion and a liquid metering portion. The gas metering portion includes an outer stationary cylinder 76 with opposite openings 80 and 82, and an inner reciprocal cylinder 84 to open and close openings 80 and 82. The liquid metering portion includes means to entrain proportional liquid flow in the form of a metering pin 86 attached to the bottom of inner cylinder 84 to move up and down therewith between open and closed positions, respectively. Liquid metering pin 86 is an elongated cylindrical member having a tapered slot 88 extending along its length with maximum slot depth at the bottom of the pin to allow increased proportional liquid flow upwardly around the pin through opening 90 as the pin is pulled further upwardly by inner cylinder 84.

Mixing valve 38 is normally closed by the downward bias of spring 92. The mixing valve includes a diaphragm 94 and disk 96 for opening the valve in response to pressure differential across diaphragm 94. An actuating passage 98 communicates between flow passage 40 and one side of mixing valve diaphragm 94. A demand passage 100 communicates between outlet 42 and the other side of mixing valve diaphragm 94.

In operation, a demand for fuel at outlet 42 reduces pressure thereat which progressively drops pressure in the system downstream from servo valve 44 until liquid pressure in passage 64, acting across sensing throttle diaphragm 60, unseats throttle valve 58 due to the reduced gas pressure in linking passage 62 against diaphragm 60. Throttle valve face 74 disengages throttle valve seat 70, opening communicating passage therethrough which induces a flow of gas across the servo valve through orifice 56, with the sensing throttle diaphragm 60 controlling this flow to properly maintain the opening of servo valve 44 and position disc 46. Mixing valve 38 remains closed from a lack of gas to produce an actuating pressure differential across diaphragm 94 until servo valve 44 opens. When the servo valve opens, gas pressure in flow passage 40 is supplied to actuating passage 98 which in combination with the reduced pressure on the other side of diaphragm 94 due to demand passage 100 supplies the pressure difference across diaphragm 94 to drive inner cylinder 84 upwardly and open the mixing valve 38.

Mixture adjustment means are provided for varying the pressure difference between the liquid pressure in passage 64 and the pressure in outlet 42 without affecting gas pressure differential across variable proportioning device 38. This enables adjustment of the gas-liquid ratio at outlet 42 without changing liquid metering pin 86. The mix adjustment means includes a threaded nut 77 and a spring 78 bearing against the throttle valve urging the latter to a closed condition against liquid pressure in passage 64.

When mix adjustment nut 77 is backed out such that spring 78 does not contact throttle valve face 74, the pressure difference across the liquid leg of the variable proportioning device 38 is approximately equal to the pressure difference across the gas leg of variable proportioning device 38. That is, the pressure difference between liquid passage 64 and outlet 42 is approximately equal to the pressure difference between gas flow passage 40 and outlet 42 because the gas pressure in linking passage 62 on one side of throttle diaphragm 60 is approximately equal to the liquid pressure in passage 64 on the other side of throttle diaphragm 60. The pressure difference across servo valve 44 is equal to the liquid head or supply pressure required to force the liquid to metering pin 86.

When mix adjustment nut 77 is screwed in with spring 78 acting to seat throttle valve 58, the pressure difference across metering pin 86 becomes the pressure difference across the gas leg of variable proportioning device 38 plus the force of spring 78 divided by the area of throttle diaphragm 60. The pressure differential across servo valve 44 then becomes the liquid head or supply pressure plus the force of spring 78 divided by the area of throttle diaphragm 60, thus providing an adjustment means.

It is thus seen that a blender 30 is provided having a gas inlet 32, an outlet 42 and a variable proportioning device 38 between the inlet and outlet. A liquid inlet 36 communicates with the liquid leg of the variable proportioning device. Located between the gas inlet and the variable proportioning device is a servo postioning valve 44 which is controlled by sensing means 58 in the form of a throttle valve which reads liquid pressure on the liquid leg of the variable proportioning device and gas pressure on the gas leg of the variable proportioning device. When mix adjustment means 77 and 78 is unloaded, throttle valve 58 positions servo valve 44 to maintain a gas pressure upstream from variable proportioning device 38 that is equal to the available liquid pressure, thereby providing equal pressure differences across the liquid leg and the gas leg of variable proportioning device 38. The mix adjustment means 77 and 78 can load throttle valve 58 against the liquid side to increase the pressure drop across servo positioning valve 44, increasing the pressure difference across the liquid leg of variable proportioning device 38.

The gas-liquid ratio at outlet 42 may thus be adjusted without changing the means to entrain proportional liquid flow such as metering pin 86. The metering base of the means to entrain proportional liquid flow is established by throttle valve 58 sensing the presence of liquid.

It should be understood that FIGS. 1 and 2 are schematic representations of the invention. FIGS. 3–6 and the following description provide a more detailed understanding of a preferred embodiment of the invention.

Figure 3:
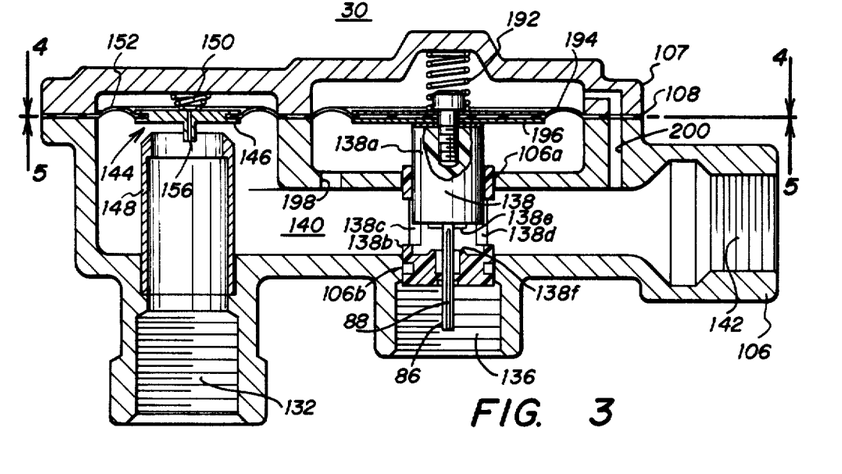
FIG. 3 is a sectional view taken along the plane which is common to the axis of the mixing valve 138 and the servo valve 144.
Figure 3A:
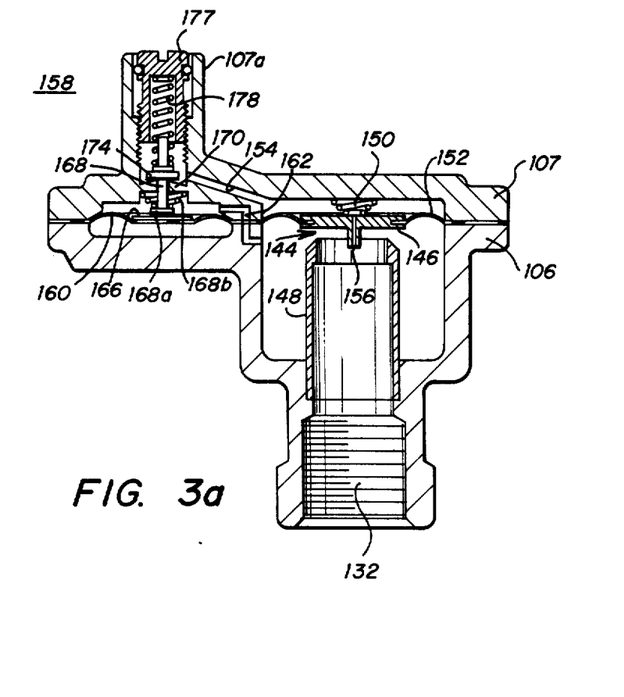
FIG 3a is a sectional view taken along the plane which is common to the axis of the servo valve 144 and the throttle valve 158.
Figure 3B:
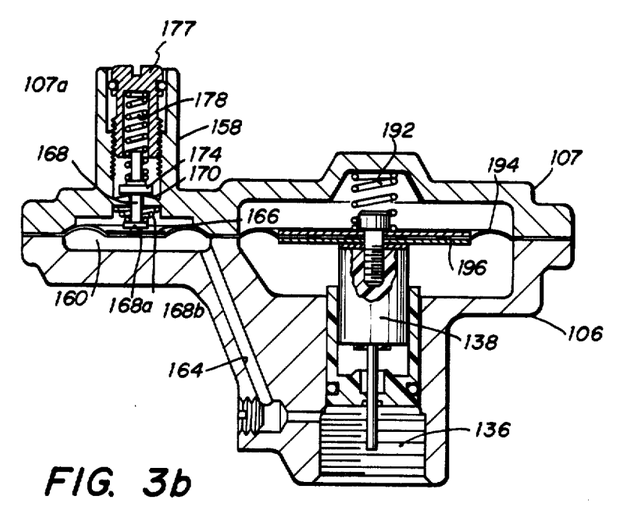
FIG. 3b is a sectional view taken along the plane which is common to the axis of the mixing valve 138 and the throttle valve 50.

FIGS. 3, 3a and 3b

In the preferred embodiment of FIG. 3, a main body 106, is provided with a gas inlet 132 and a liquid inlet 136. The outlet 142 extends from the right hand side of the body. Also provided is a cap 107, which serves to mate with the upper surface of body 106 along a diaphragm plane 108. In this embodiment, the tubular inlet passage member 148 is seated in the structure forming gas inlet 132. Member 148 extends upward to comprise the servo valve 144. The servo valve 144 also comprises a disc 146 mounted in a diaphragm 152. A bleeder orifice 156 extends through disc 146. Disc 146 is forced into contact with the upper-end of the member 148 by a spring 150.

When the servo valve 144 opens, gas from inlet 132 flows into the gas flow passage 140 for control by the variable proportioning valve 138.

Proportioning valve 138 comprises a piston 138a secured to disc 196 and movable therewith. Piston 138a works in a cylinder 138b having window 138c upstream and a window 138d downstream. Windowed cylinder 138b is mounted in sealed relation to body members 106a and 106b. A rubber washer 138e when seated on slot 138f closes orifice 88 when valve 138 closes windows 138c and 138d. Rod 86 with slot 88 serves to meter liquid from liquid inlet 136 into the gas stream passing through valve 138. A passage 198 extends from the passage 140 into the zone below the diaphragm 194 to aid in operating mixing valve 138.

It will be noted that diaphragms 52, 60 and 94 of FIG. 2 have counterparts 152 and 194 as well as 160 formed from a single unitary rubber sheet, more particularly because of the planar arrangement of the mating surfaces between the body 106 and the cap 107, a single sheet of rubber material may be employed. Three discs are secured to such sheet, two of the discs, discs 146 and 196, being shown in FIG. 3. The third disc 66 will be described in connection with FIGS. 3a and 3b.

Disc 196 is secured to the diaphragm 194 and in turn is fixably attached to the piston of the mixing valve 138. A spring 192 serves to keep the mixing valve 138 normally closed though it is shown partially open in FIG. 3.

It will be noted that a passage 200 leads from the outlet 142 to the chamber above the disc 196 extending upward through the wall of the outlet port 142 and through the wall of the cap 107.

FIG. 3a shows the relationship between the servo valve 144 and the throttle valve 158. Diaphragm 160 is connected to disc 166 which operates in conjunction with mandrel 168 to lift the valve element 174 off from the seat 170. Spring 178 serves to urge the valve member 174 onto seat 170. The adjustable nut 77 threadedly engages the upper end of the boss 107a to control the action of the throttle valve 158. Stem 168 extends through the valve seat 170. A lower disc 168a is mounted at the lower end of stem 168 and is urged downwardly by a light spring 168b. The spring 178 operates between the adjustable closure 177 and disc 174, tending to maintain disc 174 seated on the valve seat 170.

Gas pressure is applied to the chamber between the seat 170 and above diaphragm 160 by way of passage 162 which leads from the outlet of the servo valve 144 into the chamber above diaphragm 160. Liquid pressure is applied to the chamber beneath the diaphragm 160 by way of a channel 154 shown in FIG. 3b. Thus, FIG. 3a shows the relationship between the servo valve 144 and the throttle valve 158.

Referring now to FIG. 3b, the relationship between the proportion device 138 and the throttle valve 158 is shown. Here it will be seen that the passage 164 serves to apply liquid pressure from the inlet 136 to the zone beneath the diaphragm 160.

The operation of the system shown in FIGS. 3, 3a and 3b is as described in connection with FIGS. 1 and 2. The system of FIGS. 3, 3a and 3b differs from that of FIGS. 1 and 2, particularly in the relative orientation of certain of the passageways and the utilization of a single membrane which serves as the closure gaskets between the body 106 and cap 107 and at the same time serves as a member from which the diaphragms of the three pressure actuated valves may be formed.

Figure 4:
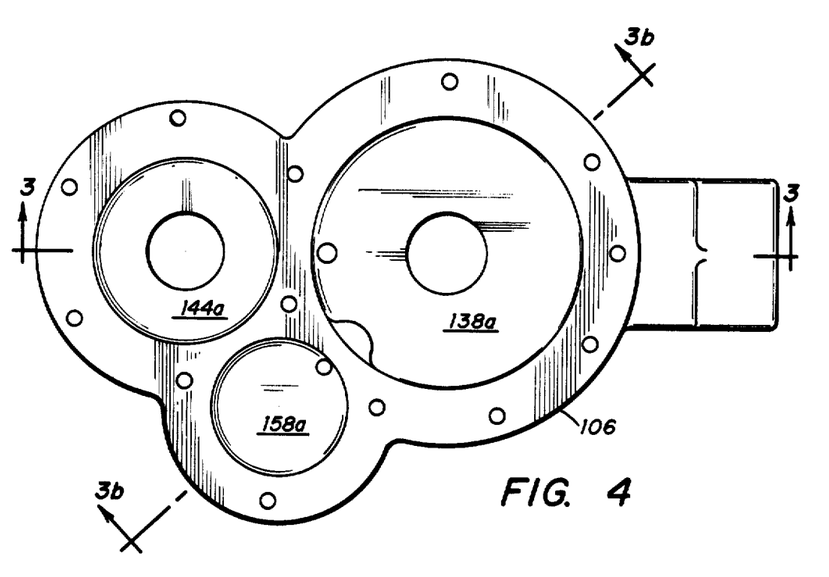
FIG. 4 is a view of the interior of the lower housing half as viewed from lines 4—4 of FIG. 3.

FIG. 4

FIG. 4 is a view looking down into the body 106 in which the mixing valve well 138a, the servo valve passage 148a and the throttle valve well 158a are shown. FIG. 4 also shows the site of the section line 3—3 represented by the sectional drawing of FIG. 3 and the section line 3b—3b, the site of the section from which the sectional view of the FIG. 3b is taken.

Figure 5:
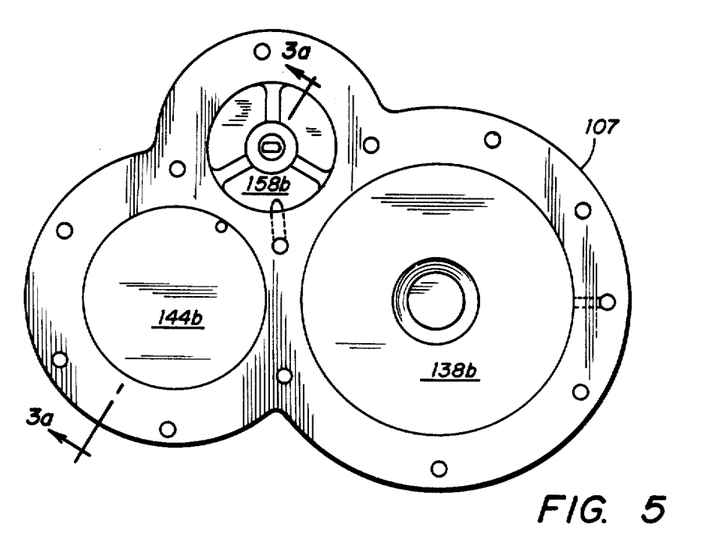
FIG. 5 is a view of the interior of the cap of FIG. 3 as viewed from lines 5—5 of FIG. 3.

FIG. 5

FIG. 5 is a view looking into the interior of the cap 107 showing the upper servo well 144b, the upper mixing valve well 138b and the upper throttle valve well 158b. Also shown in FIG. 5 is the section line 3a—3a which is the site of the section represented by the drawing FIG. 3a.

Figure 6:
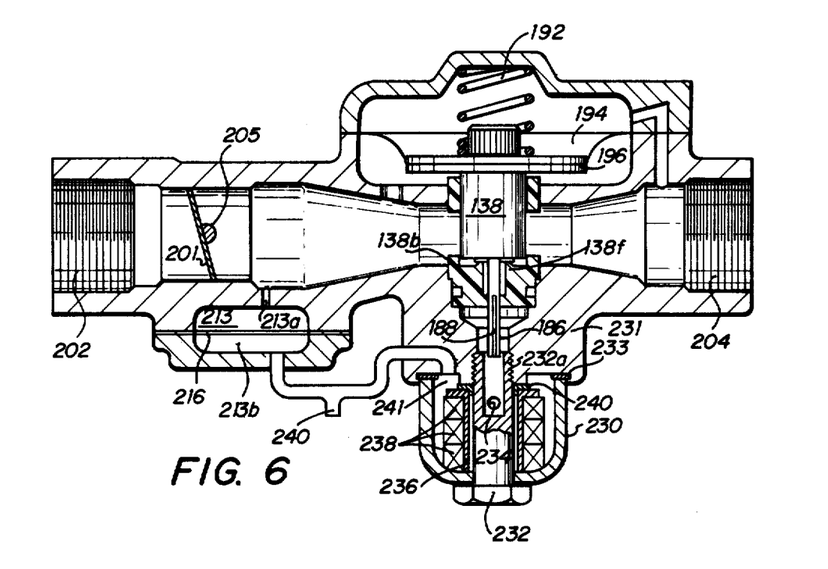
FIG. 6 is a cross sectional view of a modified form of the invention taken along the lines 6—6 of FIG. 8.
Figure 7:
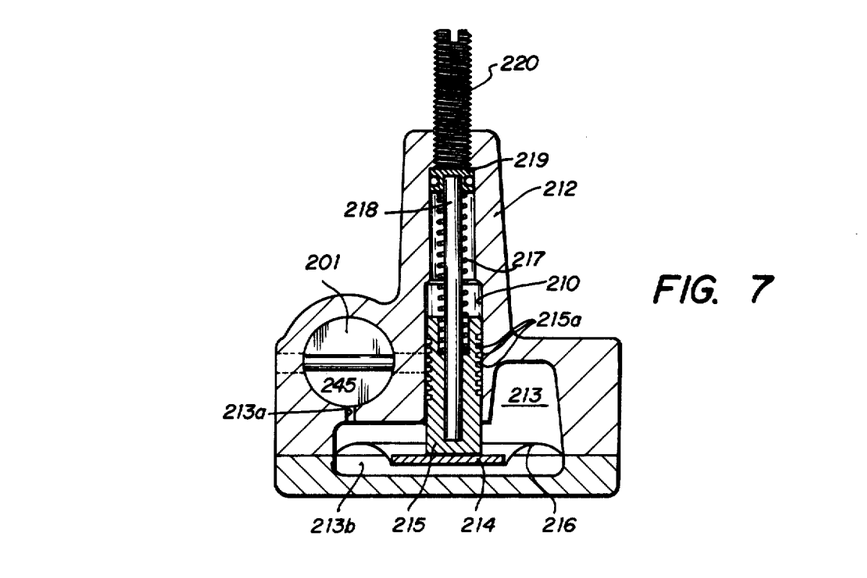
FIG. 7 is a cross sectional view of said modified form taken along the lines 7—7 of FIG. 8.
Figure 8:
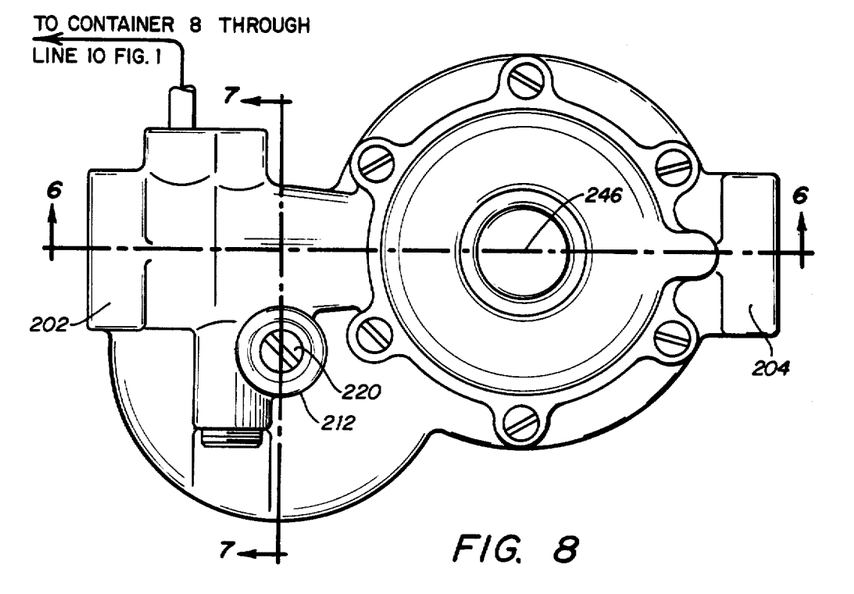
FIG. 8 is a top view of the housing of said modified form.

FIGS. 6-8

Having described the schematic representation of the system in FIGS. 1 and 2 and the preferred embodiment of FIGS. 3-5, it is noted that embodiment is particularly suitable for working with a gas pressure base of 10 psig. It has been found that where high inlet pressure via the gas inlet 32 are encountered, for example, 50 to 60 psig, better control is achieved by changing the liquid level control from the disc valve construction shown comprising disc 74 and seat 70 of FIG. 2 to a butterfly type of valve. FIGS. 6-8 illustrate a modified form of the invention wherein a butterfly valve is employed. It is to be noted that such butterfly valve construction may be used at all pressures over the ranges above indicated.

FIGS. 6-8 illustrate a modification of the invention. In this embodiment the proportioning valve or device 138 with its operating disc 196 and diaphragm 194 is mounted to control flow of gas from an inlet 202 by way of a butterfly valve 201 and thence through the passageway leading to the proportion device 138. The gas mixed with liquid passing through valve seat 138f then exits the outlet port 204. As will be seen in FIG. 7, the butterfly valve 201 is a disc which is transverse the flow channel leading from inlet 202 to the proportioning device 138. Valve disc 201 is mounted on a shaft 205 which extends into a bore 210. The bore 210 extends downward from the upper portion of a cap boss 212 to a lower chamber 213. A disc 214 serves to control the position of a piston 215 which operates in the bore 210. A piston 215 has a cylindrical gear rack formed on the exterior surface thereof which meshes with a pinnion (not shown) mounted on the end of shaft 205 which extends in FIG. 7 behind the piston 215. Rack teeth 215a are as shown.

Disc 214 is mounted in a diaphragm 216 above which pressure in chamber 213 is effective by way of passageway 213a. A spring 217 exerting a selectively variable force, surrounds a central shaft 218 and extends into a well at the lower end thereof in the upper end of piston 215. The upper end of the spring engages a travelling sealing disc 219 which is variable in position by reason of its threaded engagement with the upper end of the housing member 212.

The zone diaphragm communicates with liquid inlet by way of 240 as shown in FIG. 6, the pressure being supplied to container 8 through a suitable connection from blender body 204, FIG. 8, upstream from butterfly.

In this embodiment, as shown in FIG. 6, a flow path for the liquid passing through the slot 188 and rod 186 for mixture with the gas flow from the inlet 234 differs from that shown in FIGS. 3–5. More particularly, a dome 230 is secured to an external boss 231 on the housing by way of an anchor bolt 232. The bolt 232 has the end threaded in the zone 232a for clamping the dome 230 onto the housing 231. A gasket 233 engages the end of the dome 230.

The upper end of the bolt 232 is hollow and has a transverse port 234 therein. The structure surrounding the bolt 232 inside the dome 230 comprises a filter for liquid flowing to the elements 186, 188. More particularly, a flanged cylinder 236 is made of sintered bronze and is surrounded by three felt washers 238. A gasket 240 is provided to form a seal between the upper end of the bushing 236 and the housing. Liquid from suitable pressurized source thus flows by way of path 240 to the zone 213b below diaphragm 216 and into the zone 241 leading to the filter 236, 238.

FIG. 8 is a top view of the unit shown in FIGS. 6 and 7. The proportioning device 138 of FIG. 6 is centered on axis 246. The housing 212 serves as the mounting for the adjusting screw 220.

Thus, in the system of FIGS. 6–8 the gas pressure downstream of valve 201 appearing in chamber 213 is read against the liquid pressure in the chamber 213b for control of the gas flow rate. The liquid fuel then is also fed through flow line 240 and chamber 241 to the filters 236, 238, thence through the opening 234 in bolt 232 and upwards to the proportioning device 138.

Having described the invention in connection with certain specific embodiments thereof, it is to be understood that further modifications may now suggest themselves to those skilled in the art, and it is intended to cover such modifications as fall within the scope of the appended claims.

I claim:

1. A blender of gas and liquid fuels from a gas source and from a liquid fuel supply reservoir and having a gas inlet, and an outlet which comprises:
    a servo valve to open and close said gas inlet;
    a throttle valve;
    means to apply fuel gas under pressure to one side of said throttle valve;
    means for connecting said inlet to said liquid fuel supply reservoir to supply liquid fuel under the pressure of said gas source to the other side of said throttle valve;
    means including a variable proportioning device between said inlet and outlet responsive to reduction of gas pressure at said outlet to reduce the gas pressure on said throttle valve to open said servo valve and supply fuel gas from said inlet to said proportioning device; and
    variable passage means between said outlet and said other side of said throttle valve to entrain proportional liquid flow with gas flow in said outlet dependent upon the pressure difference between said outlet and said other side of said throttle valve.

2. The invention according to claim 1 wherein said throttle valve includes means for varying said pressure difference between said outlet and said other side of said throttle valve without affecting gas pressure differential across said variable proportioning device whereby the gas-liquid ratio at said outlet can be adjusted without modifying said means to entrain proportional liquid flow.

3. The invention according to claim 1 wherein the differential pressure across said variable passage means to entrain proportional liquid flow is established by said throttle valve including means for sensing the pressure of said liquid fuel at said other side of said throttle valve 4. The invention according to claim 1 wherein said throttle valve includes adjustable loading means having:
    (a) an unloaded condition wherein said throttle valve reads gas pressure on said one side thereof and liquid pressure on said other side thereof to position said servo valve to maintain a gas pressure upstream from said variable proportioning device which is equal to liquid pressure supplied to said variable proportioning device; and
    (b) a loaded condition loading said throttle valve against the liquid pressure on said other side thereof to increase the pressure drop across said servo valve and increase said pressure difference between said outlet and said other side of said throttle valve.

5. A blender comprising in combination:
    a gas inlet adapted for connection from a fuel gas supply source and to a liquid fuel supply reservoir;
    a servo valve for opening and closing said gas inlet;
    a mixing valve having a variable gas passage and a variable liquid passage;
    a gas flow passage from said servo valve to said mixing valve;
    a liquid fuel inlet to said mixing valve adapted for connection from said reservoir;
    an outlet for delivering mixed gas and liquid from the passages in said mixing valve upon opening of said mixing valve in response to pressure differential between said outlet and said flow passage; and
    control means responsive to the difference between gas pressure in said flow passage and liquid pressure at said liquid inlet to control said servo valve.

6. The invention according to claim 5 wherein said control means comprises a throttle valve having a diaphragm acted upon on one side by gas pressure in said flow passage and acted upon on the other side by liquid pressure at said liquid inlet, such that said throttle valve differentially senses liquid pressure and gas pressure supplied to said mixing valve and controls said servo valve in response thereto.

7. The invention according to claim 6 comprising a control passage from said flow passage to said throttle valve, and wherein the reduction in pressure in said outlet reduces gas pressure in said flow passage which reduces the pressure on the gas side of the throttle valve diaphragm whereupon liquid pressure on the liquid side of the throttle valve diaphragm causes said throttle valve to open for pressure differential control of the opening of said servo valve.

8. In a blender having a fuel gas inlet, a mixed fuel outlet and a variable proportioning device between the inlet and outlet, the combination which comprises:
    a diaphragm controlled servo valve to open and close said inlet in response to a pressure difference across the servo diaphragm;
    a flow passage on one side of the servo diaphragm communicating with said variable proportioning device to supply gas thereto from said inlet when said servo valve is open;

a throttle valve seat and a linking passage communicating between said flow passage and one side of said valve seat;

a control passage on the other side of the servo diaphragm communicating with the other side of said valve seat;

a liquid pressure inlet for supplying liquid fuel under pressure from said gas inlet to said variable proportioning device; and a diaphragm control for said throttle valve to open and close said valve seat, said linking passage, said control passage and said seat being on one side of the throttle diaphragm, the other side of said throttle diaphragm being in communication with liquid under pressure from said gas inlet and supplied to the said variable proportioning device whereby demand at said outlet reduces pressure in said flow and control passages, whereupon liquid pressure on the liquid side of the throttle diaphragm opens said valve seat to provide communication therethrough between said control passage and said linking and flow passages to reduce the pressure against said other side of the servo diaphragm and enable opening of said servo valve.

9. The invention according to claim 8 comprising adjustment means having a load condition resiliently biasing said throttle valve to close said valve seat such that the pressure difference between said outlet and said liquid pressure is equal to the pressure difference between said outlet and said flow passage plus the load pressure of said adjustment means.

10. The invention according to claim 8 wherein said throttle valve comprises a stem extending from the gas side of the throttle diaphragm through an opening in a wall separating said linking passage from said control passage, said opening forming said valve seat on the control passage side of the wall and engaged by a valve face on said stem to block communication between said linking and control passages.

11. The invention according to claim 10 comprising resilient biasing means urging said valve face into engagement with said valve seat against the liquid pressure on the liquid side of the throttle diaphragm, and means for adjustably loading said biasing means.

12. A blender comprising in combination:
a gas inlet;
a diaphragm controlled servo valve normally closing said gas inlet and opened by a pressure differential across its diaphragm;

a diaphragm controlled mixing valve normally biased closed;

a gas flow passage from said servo valve to said mixing valve;

a liquid inlet to said mixing valve;

means entraining proportional liquid flow in an open condition of said mixing valve;

an outlet from said mixing valve for delivering mixed gas and liquid; p1 a linking passage connecting said flow passage to a valve seat;

a control passage separated from said flow passage at said servo valve by the servo diaphragm and extending from said servo valve to said valve seat on the opposite side thereof from said linking passage;

a bleeder orifice through said servo valve communicating between said gas inlet and said control passage;

a diaphragm controlled throttle valve having a valve face normally engaging said valve seat to close said throttle valve and block communication between said control passage and said linking passage, said throttle valve being opened by pressure difference across the throttle diaphragm to provide communication through said valve seat between said control passage and said linking passage, the throttle diaphragm communicating on one side with gas pressure in said linking passing urging said throttle valve closed and communicating on its other side with liquid pressure in said liquid inlet urging said throttle valve open, such that gas pressure reduction in said flow and linking passages enables liquid pressure on the liquid side of the throttle diaphragm to open said throttle valve thereby reducing the pressure in said control passage and creating a pressure differential across the servo diaphragm to open said servo valve to supply gas pressure from said inlet to said flow passage;

an actuating passage connecting said flow passage to one side of the mixing valve diaphragm to enable gas pressure to urge said mixing valve to an open condition; and a demand passage connecting said outlet to the other side of the mixing valve diaphragm.

13. The invention according to claim 12 including mix adjustment means for controlling the gas to liquid ratio delivered at said outlet comprising resilient biasing means urging said throttle valve closed and adjusting means for varying the loading of said biasing means.

* * * * *